US012585955B2

(12) United States Patent
Mugan et al.

(10) Patent No.: US 12,585,955 B2
(45) **Date of Patent: *Mar. 24, 2026**

(54) MINIMAL TRUST DATA SHARING

(71) Applicant: Pulselight Holdings, Inc., Austin, TX (US)

(72) Inventors: Jonathan Mugan, Buda, TX (US); Mallika Thanky, Sanford, NC (US)

(73) Assignee: Pulselight Holdings, Inc., Austin, TX (US)

( * ) Notice: Subject to any disclaimer, the term of this patent is extended or adjusted under 35 U.S.C. 154(b) by 1034 days.

This patent is subject to a terminal disclaimer.

(21) Appl. No.: 17/537,475

(22) Filed: Nov. 29, 2021

(65) Prior Publication Data

US 2022/0083872 A1     Mar. 17, 2022

Related U.S. Application Data

(63) Continuation of application No. 16/430,143, filed on Jun. 3, 2019, now Pat. No. 11,188,827.

(60) Provisional application No. 62/680,450, filed on Jun. 4, 2018.

(51) Int. Cl.
*G06N 3/088* (2023.01)

(52) U.S. Cl.
CPC .................................... *G06N 3/088* (2013.01)

(58) Field of Classification Search
CPC ....................................................... G06N 3/02
See application file for complete search history.

(56) References Cited

PUBLICATIONS

Che (Boosting Deep Learning Risk Prediction with Generative Adversarial Networks for Electronic Health Records, 2017, arXiv:1709. 01648v1) (Year: 2017).*

(Continued)

*Primary Examiner* — Michelle T Bechtold
*Assistant Examiner* — Aaron P Gormley
(74) *Attorney, Agent, or Firm* — J. Roger Williams, Jr.

(57) ABSTRACT

A computer-implemented method of protecting confidentiality when generating synthetic training records for machine learning from sensitive data records, comprising a source computer system connected to a separate target computer system, where the target computer system comprises sensitive data records comprising private or confidential data. The source computer system performs the functions of a generator component of a generative adversarial network (GAN) and the target computer system performs the functions of a discriminator component of the GAN, where the generator and discriminator functions of the GAN are distributed between the source and target computer systems. Synthetic training records are generated using a computational process that does not reveal contents of the sensitive data records. Also disclosed is a method of training a machine-learning model using the one or more synthetic training records.

16 Claims, 7 Drawing Sheets

(56) References Cited

PUBLICATIONS

Del Val (Fully Distributed Generative Adversarial Networks, 2017, 31st Conference on Neural Information Processing Systems (NIPS 2017), Long Beach, CA, USA.) (Year: 2017).*

Erdowsi (Brainstorming Generative Adversarial Networks (BGANs): Towards Multi-Agent Generative Models with Distributed Datasets, 2023, arXiv:2002.00306v3) (Year: 2023).*

Hardy (MD-GAN: Multi-Discriminator Generative Adversarial Networks for Distributed Datasets, 2019, arXiv:1811.03850v2) (Year: 2019).*

Li (Using Machine Learning to Predict Opioid Overdoses Among Prescription Opioid Users, 2018, Value in Health 21 S1-S268 pp. 245) (Year: 2018).*

* cited by examiner

FIG. 1

MINIMAL TRUST DATA SHARING

CROSS-REFERENCE TO RELATED APPLICATIONS

This application is a continuation of pending U.S. Non-Provisional application Ser. No. 16/430,143, filed Jun. 3, 2019, which is scheduled to issue on Nov. 30, 2021 as U.S. Pat. No. 11,188,827, which application claims priority (including priority under 35 U.S.C. § 119 (e)) to U.S. Provisional Application No. 62/680,450, filed on Jun. 4, 2018, each of which prior applications is hereby incorporated by reference in its entirety.

BACKGROUND OF THE INVENTION

The field of the invention is machine learning.

Machine learning is the scientific study of algorithms and statistical models that computer systems use in order to perform a specific task effectively without using explicit instructions, relying on patterns and inference instead. Machine learning algorithms build a mathematical model based on sample data, known as "training data," to make predictions or decisions without being explicitly programmed to perform the task. The model is initially fit on a training dataset, a set of examples used to fit the parameters (e.g. weights of connections between neurons in artificial neural networks) of the model. The model (which can include, for example, a neural net or a naive Bayes classifier) is trained on the training dataset using a supervised learning method (which may include, for example, gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted.

The size and structure of a training set needed to correctly estimate or adjust the parameters of a model can differ from task to task. It is important, however, that the source or subject matter of the training data reflect the predictive features of the underlying task. For example, if the desired result is a model that yields accurate predictions of medical events, the training set should include medical data.

Often, however, the organization best equipped to process the data is not the same one that owns the data. In order for these two organizations to work together, the organization that owns the data must trust the organization that processes the data with that data. This trust issue impedes sharing of sensitive data including, for example, medical data.

One approach to solving this technological problem is obfuscation, each record is modified by removing or revising personally identifiable information, something with added randomness. The problem with this approach is that there is still a one-to-one correspondence between the obfuscated and the real records. Such "data leakage" often allows people to be re-identified. For example, if we know that you are the only person in a group that likes the movie Apocalypse Now and we remove your name from a record of your favorite movies [Apocalypse Now, Forrest Gump, The Ice Pirates], we can still learn from that obfuscated record that you like the movie The Ice Pirates because no one but you likes Apocalypse Now. This is called "data leakage."

What is needed is a way to generate synthetic training data sets from real data records without jeopardizing the privacy or confidentiality of the real data records.

BRIEF SUMMARY

Disclosed are embodiments of a computer-implemented method of protecting confidentiality when generating synthetic training records for machine learning from sensitive data records, comprising a source computer system connected to a separate target computer system, where the target computer system comprises sensitive data records. The source computer system performs the functions of a generator component of a generative adversarial network (GAN) and the target computer system performs the functions of a discriminator component of the GAN, where the generator and discriminator functions of the GAN are distributed between the source and target computer systems. Synthetic training records are generated using a computational process that does not reveal contents of the sensitive data records and are stored on the source computer system. Also disclosed is an embodiment of a method of training a machine-learning model using the one or more synthetic training records. Also disclosed is an embodiment of a computer system for protecting confidentiality when generating synthetic training records for machine learning from sensitive data records.

Sensitive data records comprise private or confidential data. Sensitive data records may include medical data or medical data relating to opioid use.

FIGURES

FIG. 1 illustrates an exemplary system used in creating synthetic data records from a set of real data records.

FIG. 2 describes an exemplary computer environment for implementing the methods described herein.

DETAILED DESCRIPTION

A generative adversarial network (GANs) can be used to generate synthetic data records. Exemplary methods for generating synthetic data records using GANs are described in Ian J. Goodfellow, Jean Pouget-Abadie, Mehdi Mirza, Bing Xu, David Warde-Farley, Sherjil Ozair, Aaron Courville, Yoshua Bengio, Generative Adversarial Networks, https://arxiv.org/abs/1406.2661 (Goodfellow et al., 2014).

A GAN consists of a generator and a discriminator. The generator generates synthetic data records and the discriminator tries to tell if the synthetic records are real or not. The discriminator serves as the error function for the generator. In a conventional embodiment, the GAN is run from a single code base. One of the insights innovations described here is distributing the GAN into two (or more) systems to preserve confidentiality of the data records.

The invention allows organizations to work together by lowering the amount of trust required between the organizations. Embodiments of the method create synthetic data records from a set of real data records without the record generation model having to process the real records. Embodiments of the GAN systems described herein are distributed so that when two organizations interact, the organization that owns the data does not have to reveal the data to the organization that processes the data. One could run the entire GAN on the same system that contains the data, but this would require that the organization that owns the data have all the resources, computational power, technical expertise, and interest in performing the complex computational process of associated with generating the records.

Figure 1:
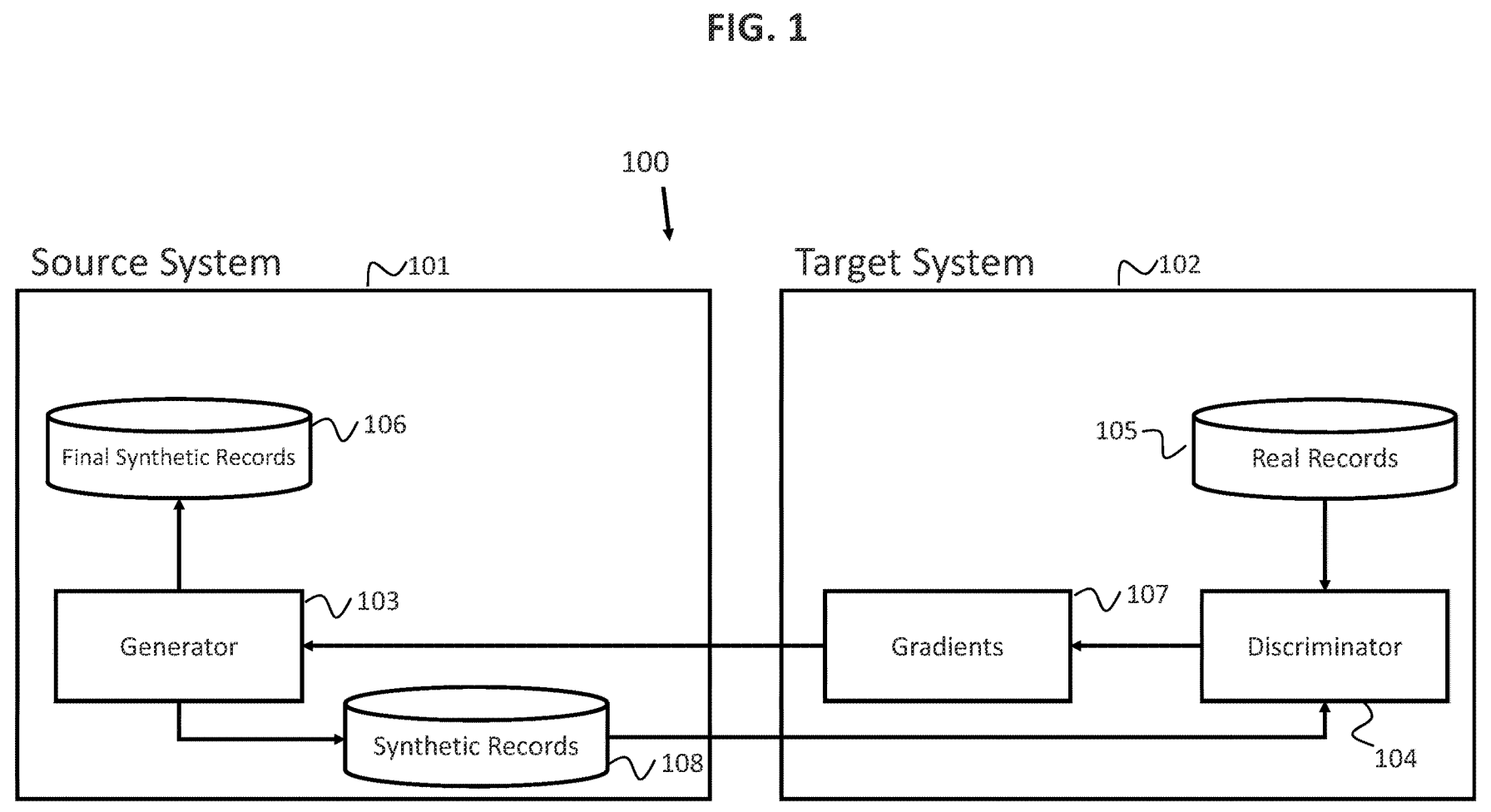
Figure 5:
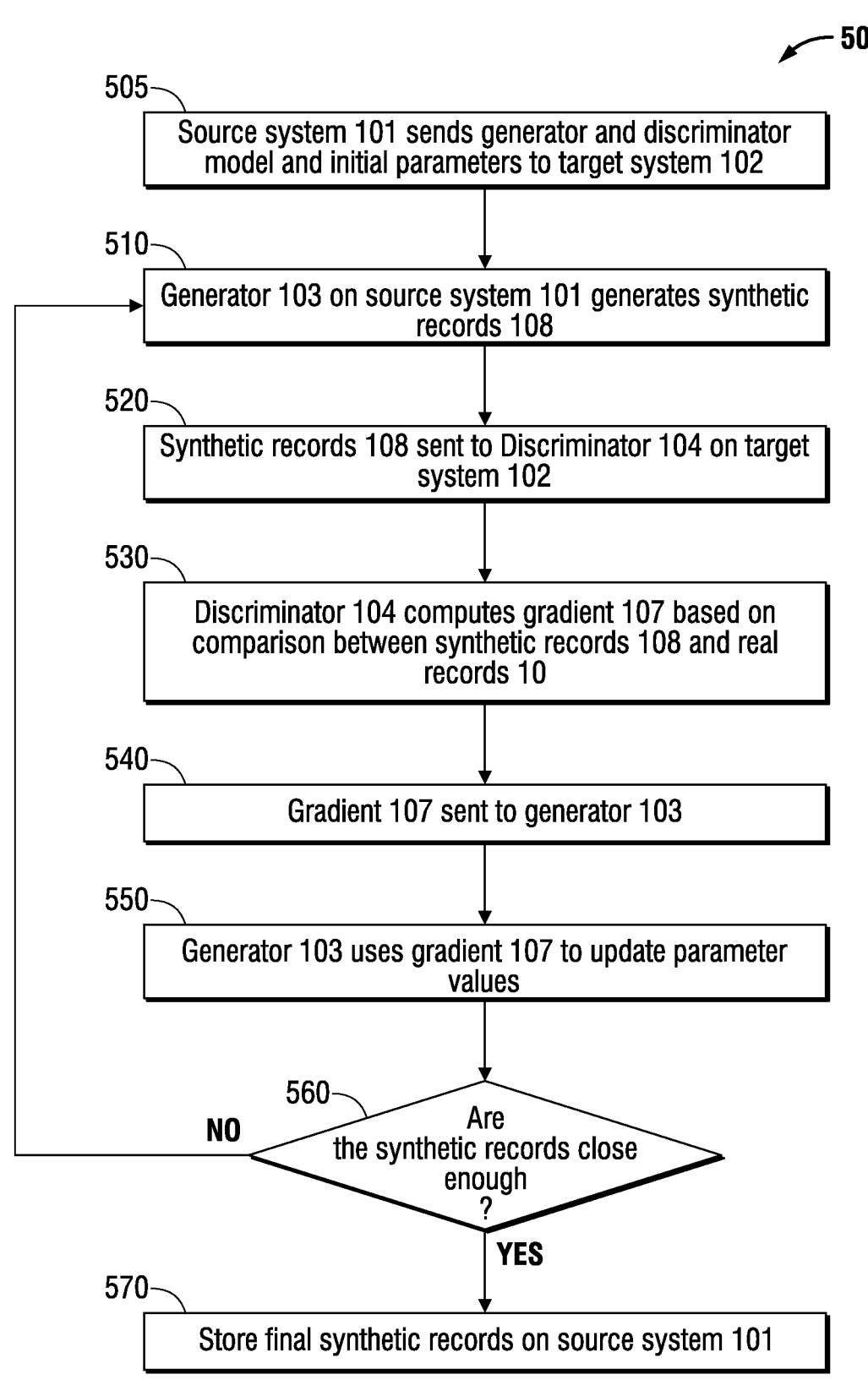
FIG. 5 illustrates an embodiment of an exemplary process for generating synthetic records.

FIG. 1 illustrates an exemplary system used in creating synthetic data records from a set of real data records, and FIG. 5 illustrates an embodiment of an exemplary process 500 for generating synthetic records. The source system 101 is controlled by the organization that processes the data to generate synthetic data 106. The target system 102 is controlled by the organization that owns the data 105. Initially, the source system 101 transmits to target system 102 the generator and discriminator model and initial parameters. (FIG. 5, 505). The generator 103 creates synthetic records 108 using a neural network. (FIG. 5, 510) There are many ways to do this for the first iteration, and one common way is to take the output values from the top layer of the neural network as the record values.

These synthetic records 108 are then sent from the source system 101 to the target system 102 (FIG. 5, 520) over a communication channel such as the Internet. Specifically, the synthetic records 108 are sent to the discriminator 104. The discriminator 104 is a classifier that learns to tell the difference between synthetic records 108 and real records 105. The discriminator, in an embodiment, is a feedforward neural network. Using backpropagation, the measured ability of the discriminator to classify synthetic records leads to gradient updates for the generator 103. In an embodiment, the discriminator 104 has the structure and the initial and current parameter values of the generator 103 to compute this gradient. (FIG. 5, 530) The parameter values of the generator 103 are kept in sync on the discriminator 104, which stores the initial generator parameter values and computes the gradients 107 (the changes in those parameter values), which are sent to the generator 103. (FIG. 5, 540) This allows the discriminator 104 to form complete structure and updated parameters (preferably as discussed herein in connection with parametric models) so it can compute the derivative of the error function to get the gradients to update both the discriminator and the generator. (FIG. 5, 550) These gradient updates 107 make the generator 103 better at generating synthetic records 108, and as the newly generated synthetic records 108 become harder to distinguish from the real records 105, the discriminator 104 gets better.

The loop runs multiple times. The generator 103 creates synthetic records 108 and passes them to the discriminator 104, which leads to gradients 107, which update the generator 103. The discriminator 104 is also trained, preferably on each iteration of the loop. This looping process runs for as long as necessary for the generator 103 to learn to generate good synthetic records 108 (FIG. 5, 560) and once the generator 103 is sufficiently good, it can create a final set of synthetic records 106 to use for processing and analysis. (FIG. 5, 570) In an embodiment, generator 103 is sufficiently good when the ability of the discriminator 104 to distinguish real from generated records stops decreasing. In an alternative embodiment, generator 103 is sufficiently good when an aggregate measure of the probability of being real of records in the current synthetic data set exceeds an operator-determined threshold. In an alternative embodiment, generator 103 is sufficiently good when a set of generated synthetic records are judged useful by an outside process or person. In an embodiment, discriminator 104 communicates to generator 103 the results of the comparison or other comparison data, and an embodiment, generator 103 uses the comparison data to evaluate whether generator 103 is sufficiently good.

In embodiments described herein, the source system and target system are separate computer systems, preferably connected only by a network connection, and the contents of real records on the target system are hidden, private and confidential, and are not disclosed to the source system or the operator of source system.

Figure 3:
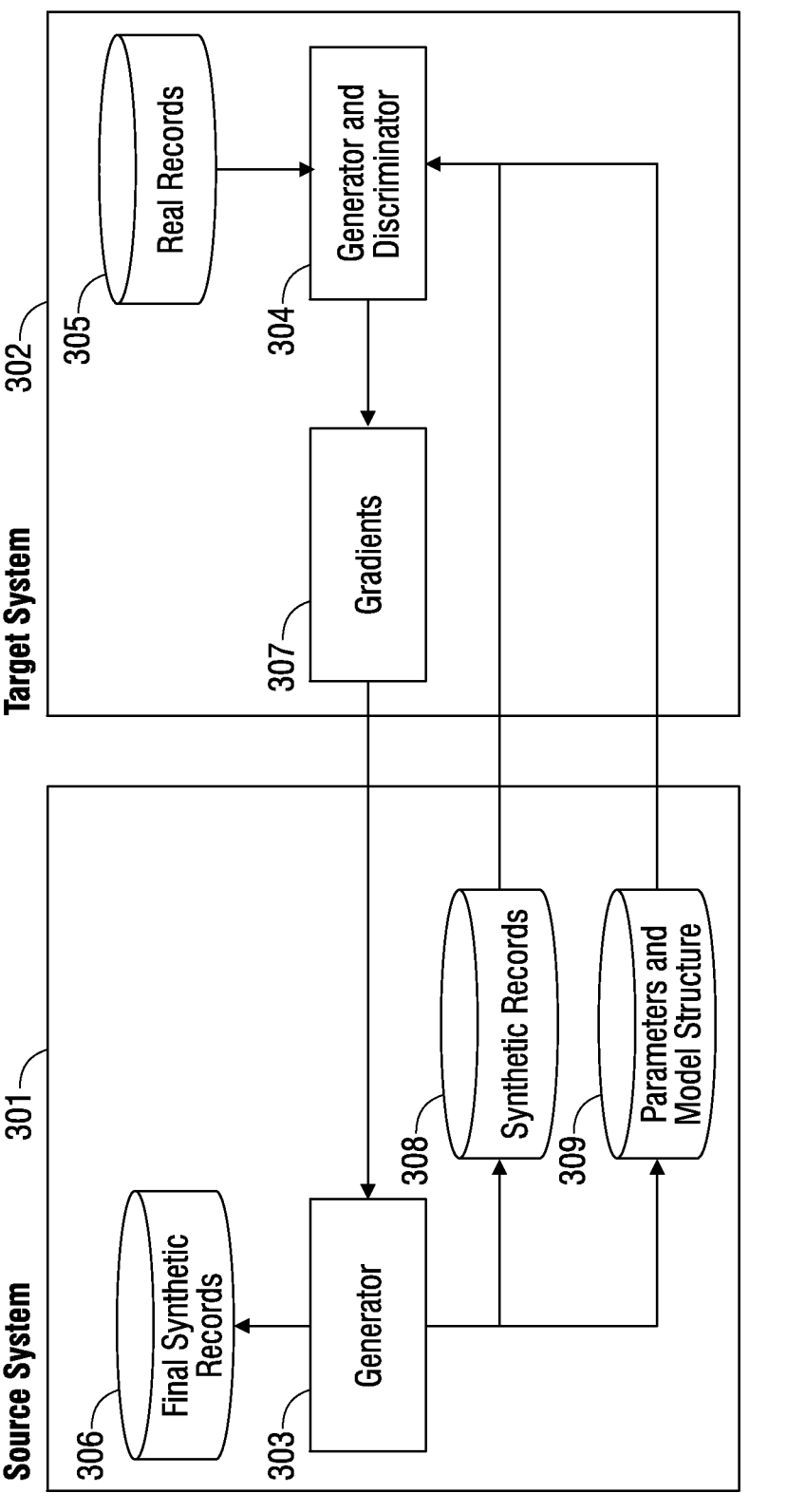
FIG. 3 illustrates an alternative embodiment of an exemplary system used in creating synthetic data records from a set of real data records.
Figure 6:
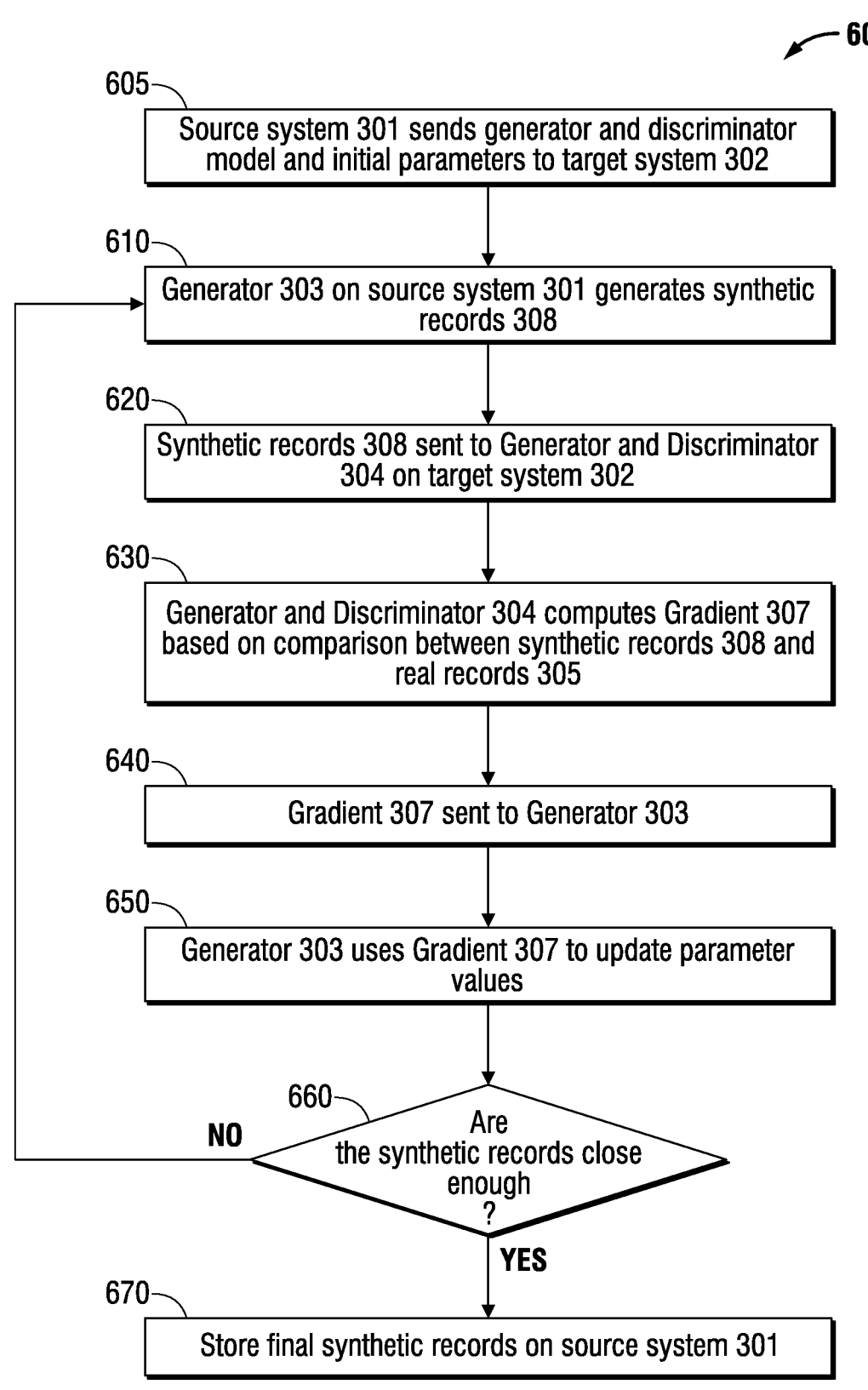
FIG. 6 illustrates an embodiment of an exemplary process for generating synthetic records.

FIG. 3 illustrates an embodiment of an exemplary system used in creating synthetic data records from a set of real data records, and FIG. 6 illustrates an embodiment of an exemplary process 600 for generating synthetic records. The source system 301 is controlled by the organization that processes the data to generate synthetic data 306. The target system 302 is controlled by the organization that owns the data 305. Initially, the source system 301 transmits to target system 302 the generator and discriminator model structure and initial parameters 309. (FIG. 6, 605). The source system generator 303 creates synthetic records 308 using a neural network. (FIG. 6, 610).

These synthetic records 308 are then sent from the source system 301 to the target system 302 over a communication channel such as the Internet. (FIG. 6, 620). Specifically, the synthetic records 308 are sent to Generator and Discriminator 304. In this embodiment, the functions of a generator and a discriminator are combined in Generator and Discriminator 304, which includes the entire model. Generator and Discriminator 304 is a classifier that learns to tell the difference between synthetic records 308 and real records 305. (FIG. 6, 630) Generator and Discriminator 304, in an embodiment, is a feedforward neural network. Using backpropagation, the measured ability of Generator and Discriminator 304 to classify synthetic records leads to gradient updates for the generator 303. In an embodiment, Generator and Discriminator 304 uses the structure and the initial and current parameter values of the generator 303 to compute this gradient. The parameter values of the generator 303 are kept in sync on Generator and Discriminator 304, which stores the initial generator parameter values and computes the gradients 307 (the changes in those parameter values), which are sent to the generator 303. (FIG. 6, 630, 640). This allows the Generator and Discriminator 304 to form complete structure and updated parameters so it can compute the derivative of the error function to get the gradients to update both the discriminator and the generator. These gradient updates 307 make the generator 303 better at generating synthetic records 308 (FIG. 6, 650), and as the newly generated synthetic records 308 become harder to distinguish from the real records 305 (FIG. 6, 660), Generator and Discriminator 304 gets better. In an embodiment, the parameters and model structure 309 stored on source system 301 are transmitted to Generator and Discriminator 104 over a communication channel such as the internet. The model structure preferably is transmitted once, but the parameters in an embodiment are transmitted on each iteration of the loop.

"Model," in embodiments described herein, means a non-linear parametric model. The model structure is the way the function is set up. Embodiments of models described herein are feed-forward neural networks, but the structure can be multiple kinds of combinations of operators, such as with convolutional neural networks, and recurrent neural networks. The generator preferably is a non-linear parametric model that outputs a vector. The discriminator preferably is a non-parametric model that outputs a distribution over labels. The error function for the generator of the GAN comes from the probability the discriminator assigns the label "real" for a fake record (and conversely for a real record). In an embodiment in which the Generator G and Discriminator D are both non-linear parametric models, if x is generated by G, then the error function for G comes from D(x). This error function is used to train the generator. The discriminator is trained as a learning problem of predicting real and fake records.

Figure 4:
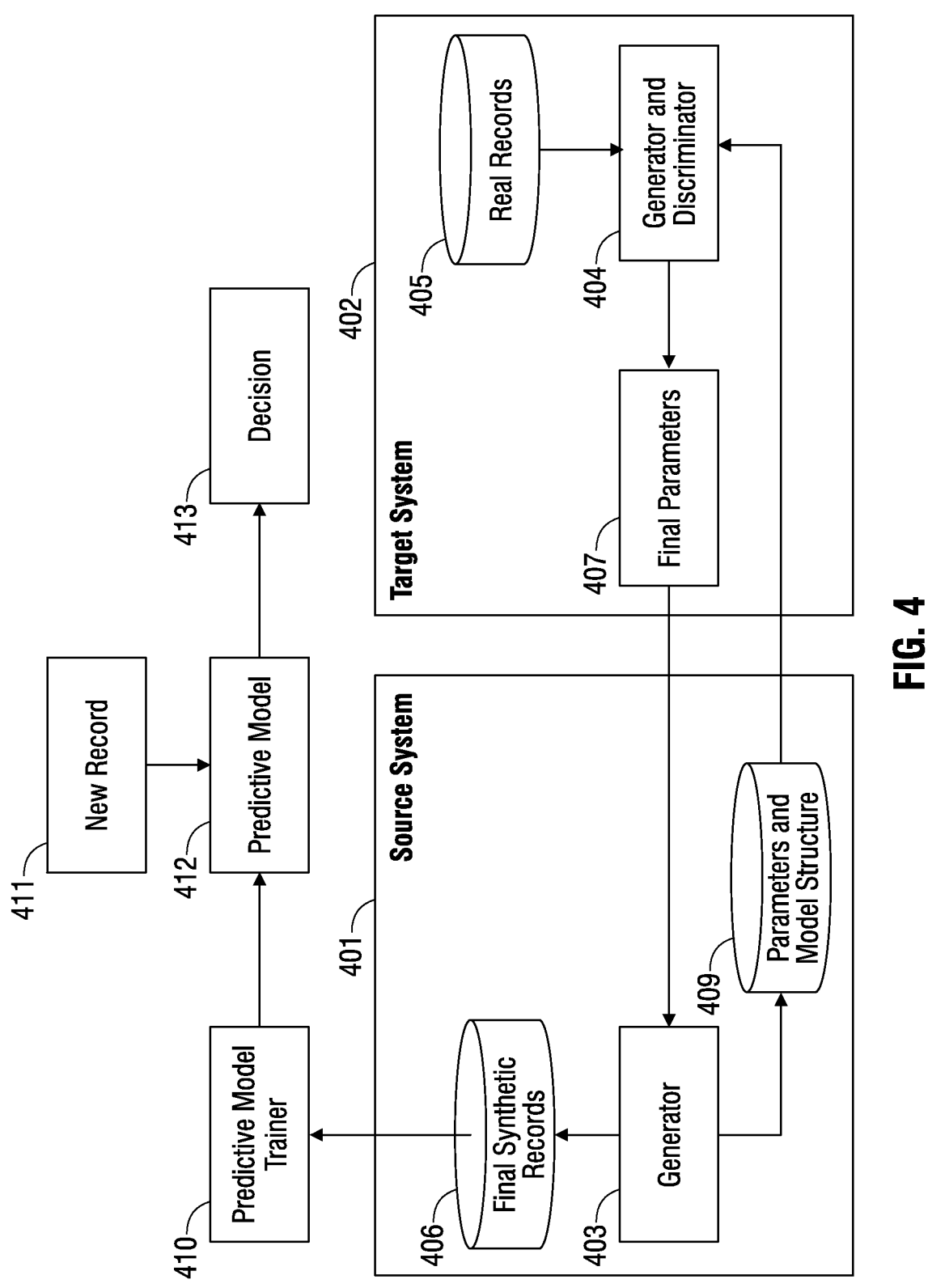
FIG. 4 illustrates another alternative embodiment of an exemplary system used in creating synthetic data records from a set of real data records.
Figure 7:
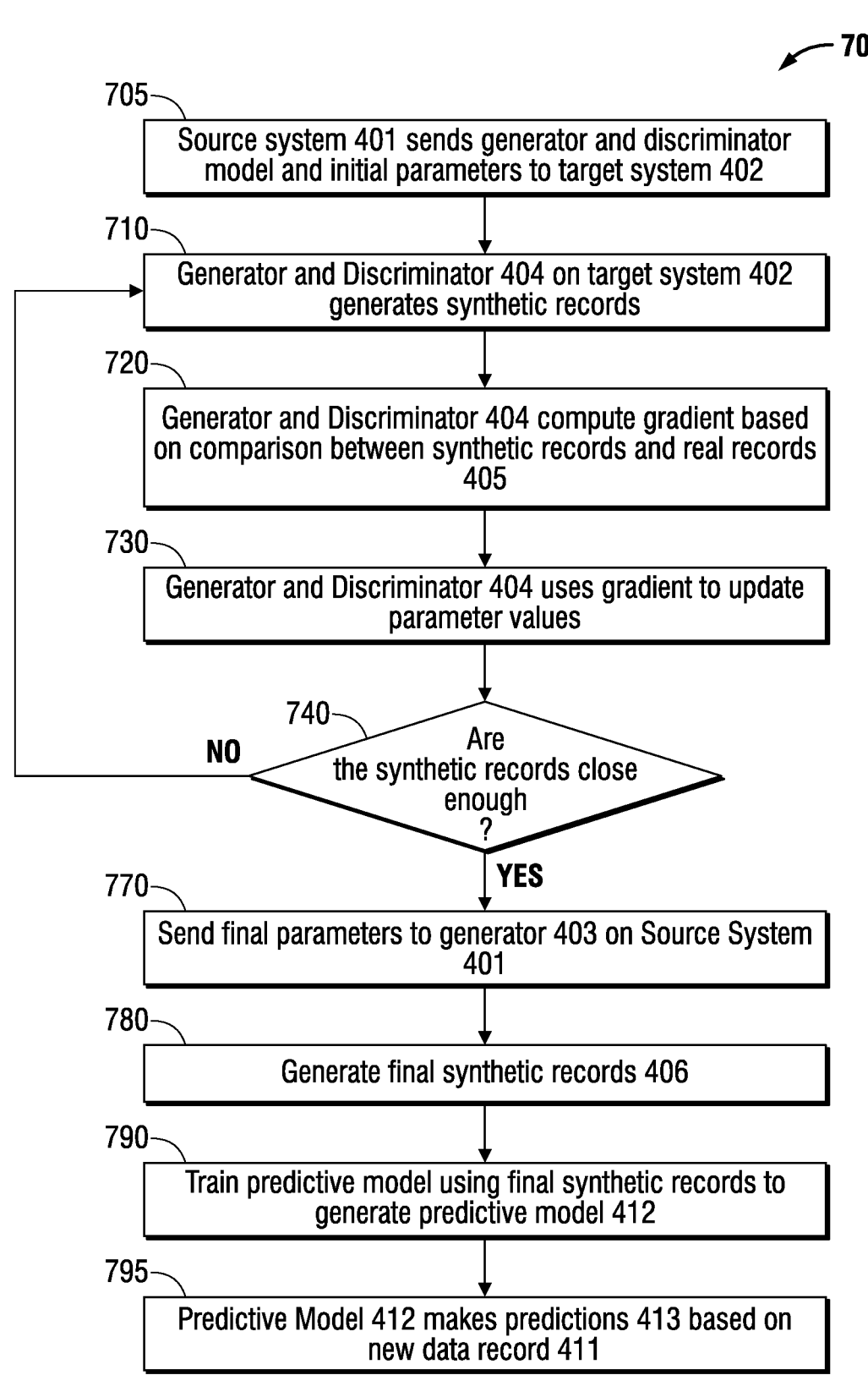
FIG. 7 illustrates an embodiment of an exemplary process for generating synthetic records.

FIG. 4 illustrates another embodiment of an exemplary system used in creating synthetic data records from a set of real data records, and FIG. 7 illustrates an embodiment of an exemplary process 700 for generating synthetic records. (FIG. 7). In this embodiment, the parameters and model structure 409 are transmitted to the target system 402 (FIG. 7, 705). Generator and Discriminator 404 run on the target system 402 in a GAN fashion, using the real records 405 and computing a gradient to update parameter values and then create a new set of synthetic records using the updated parameter values. (FIG. 7, 710, 720, 730). When this process has run for a user-specified amount of time, (FIG. 7, 740), the final parameters 407 are transmitted from target system 402 to the generator 403 on the source system 401. (FIG. 7, 770) This generator 403 creates synthetic data records 406 that are used by a predictive model trainer 410. (FIG. 7, 780, 790). The output of the trainer is a predictive model 412. Some new data record 411 can be fed into the predictive model 412, and the predictive model will make a decision or prediction 413. (FIG. 7, 795)

For example, imagine that one wants to make a predictor to determine who is at risk of overdose from opioids. The data for who has overdosed and not overdosed in the past is controlled by another organization, and they do not want to share their data, which resides on the target system 402. The GAN training is run on the target system and the final parameters of a model are passed to the generator 403. The generator can then generate a large number of synthetic records 406. Some of those records will have the overdose label set to yes, and some will have the overdose label set to no. These data records are then fed into the model trainer 410, which learns a predictive model for the overdose label. Then, for some new person, one can get a medical record 411 and predict (413) whether that person will overdose.

The following discussion describes an embodiment of the iterative process of training the model and refining the parameter values of the model for an exemplary nonlinear parametric model.

Consider a set of training examples (X, Y) where each element of $(x_i, y_i) \in (X, Y)$ consists of an instance where $x_i$ is the features and $y_i$ is what we want to predict. Assume that there are n training instances in (X, Y). We want to learn a function of the form $$y = f(x)$$

The function $f$ that we will learn is a nonlinear parametric function. One simple such function could be $$y = f(x) = \sigma(wx + b) = \sigma(g(x))$$

Where $g(x) = wx + b$, w is a vector of parameters, b is a single parameter, and a is a nonlinear function, for example, a sigmoid. To learn function $f$, we need to learn values for the parameters w and b, and an embodiment does this by searching for a set of values for those parameters that allow function $f$ to best approximate the training data (X, Y).

We will use an embodiment of an error function E(w, b) that measures how well the values for parameters w and b allow function $f$ to approximate the training data (X, Y).

$$E(w, b) = \frac{1}{2}\sum_{i=1}^{n}(y_i - f(x_i))^2 = \frac{1}{2}\sum_{i=1}^{n}(y_i - \sigma(wx + b))^2$$

We set the parameters to initial values, such as random values from a Gaussian distribution, or zeros; and we iteratively update the parameters to lower the value of the error function using gradient descent. Gradient descent is an iterative method where we set the values of the parameters, compute gradient $\nabla E(w, b)$ of the error function E(w, b) at those parameter values, and use the gradient to update the parameter values. The gradient may be computed automatically using Theano or other commercially-available software libraries, and the steps involved in computing a gradient are within the knowledge of the person of ordinary skill in the art. The following discussion describes an exemplary method of computing the gradient in an embodiment.

The gradient $\nabla E(w, b)$ is a vector representing the point of steepest ascent in parameter space. If we let $w_i$ represent a parameter value, such as b or at an index in vector w, and if we assume that there are m such parameter values (in this case w is a vector of length m−1), we can write the gradient as $$\nabla E(w, b) = \left[\frac{\partial E}{\partial w_j}, \dots, \frac{\partial E}{\partial w_m}\right]$$

Gradient descent updates the parameters using the equation $$w_j = w_j + \Delta w \text{ where}$$

$$w = -\alpha\frac{\partial E}{\partial w_j}$$

where $\alpha$ is the learning rate, such as 0.2. The negative sign is there because we want to go in the opposite direction of the error; we want to reduce error. The gradient vector $\nabla E(w, b)$ determines in what direction we go to update the parameters, and the learning rate determines how far we go in that direction to update the parameters.

To compute $$\frac{\partial E}{\partial w_i},$$

we use the chain rule of derivatives $$\frac{\partial E}{\partial w_j} = \frac{dE}{df}\frac{df}{dg}\frac{\partial g}{\partial w_j} \text{ where}$$

-continued $$\frac{\partial E}{\partial w_j} = \frac{d}{df} \frac{1}{2} \sum_{i=1}^{n} (y_i - f(x_i))^2 \frac{df}{dg} \frac{\partial g}{\partial w_j} = \sum_{i=1}^{n} (y_i - f(x_i)) \frac{df}{dg} \frac{\partial g}{\partial w_j}$$

In an embodiment, the nonlinearity σ is the sigmoid function $$\sigma(wx + b) = \frac{1}{1 + e^{-(wx+b)}}$$

which has the derivative $$\frac{df}{dg} = \frac{d\sigma(wx + b)}{dg} = \sigma(wx + b)(1 - \sigma(wx + b)) \text{ and}$$

$$\frac{\partial g}{\partial w_j} = x_{ij}$$

where $x_{ij}$ is the jth value of input vector i. In total, we have $$\frac{\partial E}{\partial w_j} = \sum_{i=1}^{n} (y_i - \sigma(wx + b)) \sigma(wx + b)(1 - \sigma(wx + b)) x_{ij}$$

The previous discussion disclosed how to update the weights for $f$ when $f$ has a simple form. Embodiments of backpropagation may be used in other applications, for example, if $f$ becomes more complex with multiple layers. Imagine $f$ (x) has the form $$f(x) = f^3(g^3(f^2(g^2(f^1(g^1(x))))))$$

where $$g^1(x) = W^1 x + b^1$$

$$f^1(x) = \sigma(g^1(x))$$

$$g^2(x) = W^2 f^1(x) + b^2$$

$$f^2(x) = \sigma(g^2(x))$$

$$g^3(x) = w^3 f^2(x) + b^3$$

$$f^3(x) = \sigma(g^3(x))$$

so that $$f(x) = \sigma(w^3(\sigma(W^2(\sigma(W^1(x) + b^1)) + b^2)) + b^3)$$

where $W^1$ and $W^2$ are matricies, $w^3$, $b^1$, and $b^2$ are vectors, and $b^3$ is a scalar. These values make it so that functions $f^2$, $f^1$, $g^2$, and $g^1$ return vectors, and functions $f^3$ and $g^3$ return scalars. To compute $$\frac{\partial E}{\partial w_{ij}}$$

where $w_{ij}$ is a parameter in $W^1$, we have to account for all of the "paths" through which a change in $w_{ij}$ could affect E. This is what backpropagation provides μs.

For the top level, l=3, we have $$\frac{\partial E}{\partial w_j} =$$

$$\frac{dE}{dg^3} \frac{\partial g^3}{\partial w_j} = \frac{dE}{df} \frac{df}{dg} \frac{\partial g}{\partial w_j} = \sum_{i=1}^{n} (y_i - f^3(x_i)) \sigma(g^3(x_i))(1 - \sigma(g^3(x_i))) f_j^2(x_i)$$

where the subscript j indicates jth position of the output of vector-valued function $f^2$. The approach we use for a single training value x for levels l=1 and l=2 is as follows $$\frac{\partial E}{\partial w_{ij}^l} = \frac{\partial E}{\partial g_j^l} \frac{\partial g_j^l}{\partial w_{ij}}$$

$$\frac{\partial g_j^l}{\partial w_{ij}^l} = \begin{cases} f_i^{l-1} \text{ if } l > 1 \\ x_i \text{ otherwise} \end{cases}$$

$$\frac{\partial E}{\partial g_j^l} = \frac{\partial E}{\partial f_j^l} \frac{\partial f_j^l}{\partial g_j^l}$$

$$\frac{\partial f_j^l}{\partial g_j^l} = \begin{cases} \sigma(g_j^l)(1 - \sigma(g_j^l)) \text{ if } l > 0 \\ \sigma(x_j)(1 - \sigma(x_j)) \text{ otherwise} \end{cases}$$

$$\frac{\partial E}{\partial f_i^l} = \sum_{k \in above(l)} \frac{\partial g_k^{l+1}}{\partial f_i^l} \frac{\partial E}{\partial g_k^{l+1}} = \sum_{k \in above(l)} \partial w_{ik}^l \frac{\partial E}{\partial g_k^{l+1}}$$

In this case, $x_i$ means the ith value of input vector x, and above(l) is the set of indicies in the vector valued function in the level above l.

The exemplary backpropagation algorithm described above works for an arbitrary number of levels l.

Figure 2:
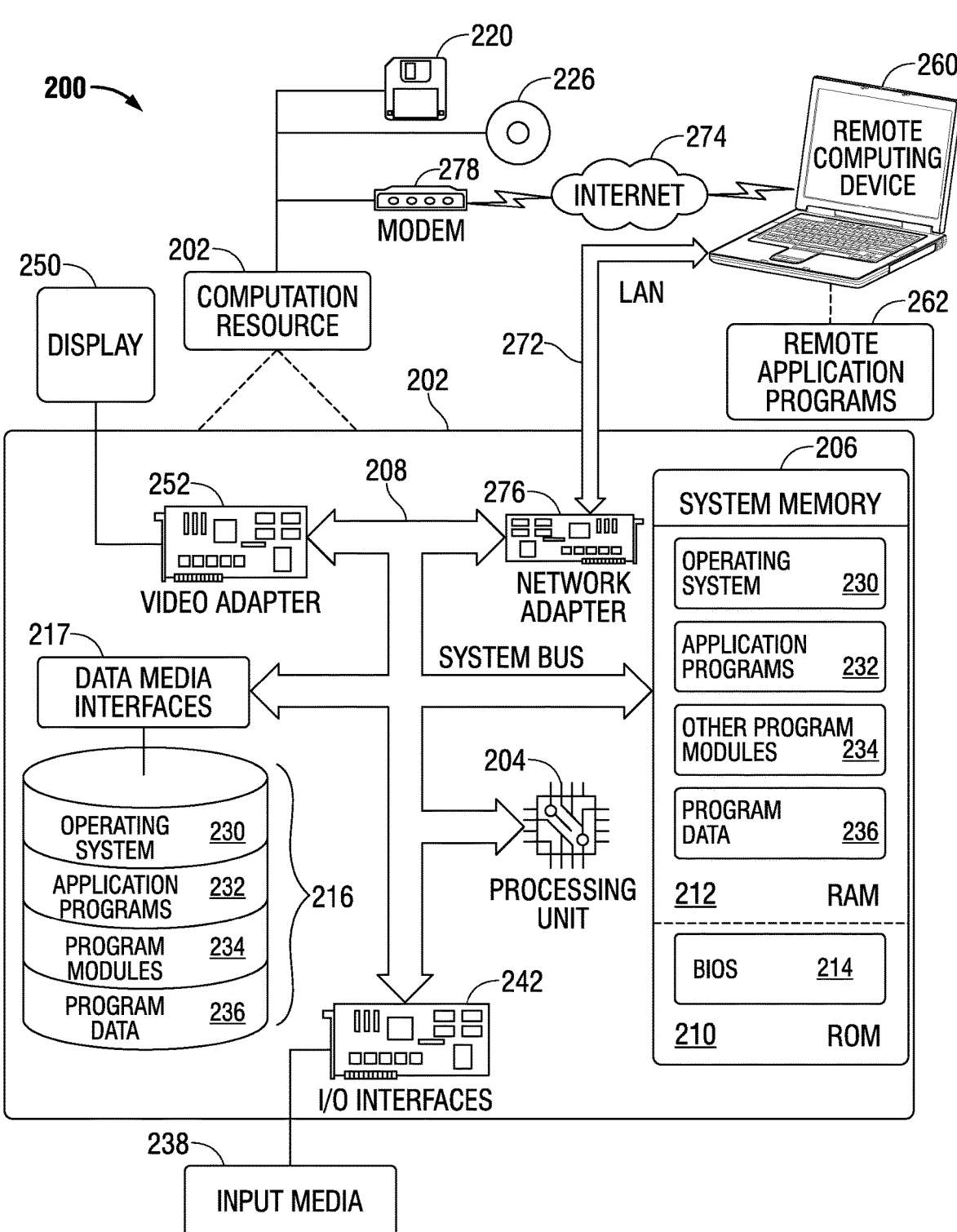

FIG. 2 illustrates an example of a general computer environment 200 useful in the context of the environments of FIG. 1, in accordance with an implementation of the disclosed subject matter. The general computer environment 200 includes a computation resource 202 capable of implementing the processes described herein. It will be appreciated that other devices can alternatively used that include more components, or fewer components, than those illustrated in FIG. 2.

The illustrated operating environment 200 is only one example of a suitable operating environment, and the example described with reference to FIG. 2 is not intended to suggest any limitation as to the scope of use or functionality of the implementations of this disclosure. Other computing systems, architectures, environments, and/or configurations can be suitable for implementation and/or application of the subject matter disclosed herein.

The computation resource 202 includes one or more processors or processing units 204, a system memory 206, and a bus 208 that couples various system components including the system memory 206 to processor(s) 204 and other elements in the environment 200. The bus 208 represents one or more of any of several types of bus structures, including a memory bus or memory controller, a peripheral bus, an accelerated graphics port and a processor or local bus using any of a variety of bus architectures, and can be compatible with SCSI (small computer system intercon-nect), or other conventional bus architectures and protocols. Bus 208 may include logical and physical interconnection, including a network or WAN connection, to operationally couple one or more system components located remotely to other system components coupled to Bus 208.

The computation resource 202 may include computers or processors operating in parallel, including architectures in which some of the parallel computers or processors are remote and/or virtual. Computation resource 202 may be implemented on one or more servers that perform the software functions in a hosted Software As A Service (SAAS) environment.

The system memory 206 includes nonvolatile read-only memory (ROM) 210 and random access memory (RAM) 212, which may or may not include volatile memory elements. A basic input/output system (BIOS) 214, containing the elementary routines that help to transfer information between elements within computation resource 202 and with external items, typically invoked into operating memory during start-up, is stored in ROM 210. System memory 206 may contain non-volatile or volatile memory components located remotely and coupled to computation resource 202 by conventional logical and/or physical interconnections, including a network or WAN connection.

The computation resource 202 further can include a non-volatile read/write memory 216, represented in FIG. 2 as a hard disk drive, coupled to bus 208 via a data media interface 217 (e.g., a SCSI, ATA, or other type of interface); a magnetic disk drive (not shown) for reading from, and/or writing to, a removable magnetic disk 220 and an optical disk drive (not shown) for reading from, and/or writing to, a removable optical disk 226 such as a CD, DVD, or other optical media. Non-volatile read/write memory 216 may include one or more non-volatile memory components located remotely and coupled to computation resource 202 by conventional logical and/or physical interconnections, including a network or WAN connection.

The non-volatile read/write memory 216 and associated computer-readable media provide nonvolatile storage of computer-readable instructions, data structures, program modules and other data for the computation resource 202. Although the exemplary environment 200 is described herein as employing a non-volatile read/write memory 216, a removable magnetic disk 220 and a removable optical disk 226, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 216, magnetic disk 220, optical disk 226, ROM 210, or RAM 212, including an operating system 230, one or more application programs 232, other program modules 234 and program data 236. Examples of computer operating systems conventionally employed include LINUX,® Windows® and MacOS® operating systems, and others, for example, providing capability for supporting application programs 232 using, for example, code modules written in the C++® computer programming language or an interpreted language such as Python.

A user can enter commands and information into computation resource 202 through input devices such as input media 238 (e.g., keyboard/keypad, tactile input or pointing device, mouse, foot-operated switching apparatus, joystick, touchscreen or touchpad, microphone, antenna etc.). Such input devices 238 are coupled to the processing unit 204 through a conventional input/output interface 242 that is, in turn, coupled to the system bus. A monitor 250 or other type of display device is also coupled to the system bus 208 via an interface, such as a video adapter 252. One or more remote input devices or display devices may be coupled to computation resource 202 by conventional logical and/or physical interconnections, including a network or WAN connection.

The computation resource 202 can include capability for operating in a networked environment using logical connections to one or more remote computers, such as a remote computer 260. The remote computer 260 can be a personal computer, a server, a router, a network PC, a peer device or other common network node, and typically includes many or all of the elements described above relative to the computation resource 202. In a networked environment, program modules depicted relative to the computation resource 202, or portions thereof, can be stored in a remote memory storage device such as can be associated with the remote computer 260. By way of example, remote application programs 262 reside on a memory device of the remote computer 260. The logical connections represented in FIG. 2 can include interface capabilities, a storage area network (SAN, not illustrated in FIG. 2), local area network (LAN) 272 and/or a wide area network (WAN) 274, but can also include other networks.

Such networking environments are commonplace in modern computer systems, and in association with intranets and the Internet. In certain implementations, the computation resource 202 executes an Internet Web browser program (which can optionally be integrated into the operating system 230), such as the "Internet Explorer®"" Web browser manufactured and distributed by the Microsoft Corporation of Redmond, Washington When used in a LAN-coupled environment, the computation resource 202 communicates with or through the local area network 272 via a network interface or adapter 276. When used in a WAN-coupled environment, the computation resource 202 typically includes interfaces, such as a modem 278, or other apparatus, for establishing communications with or through the WAN 274, such as the Internet. The modem 278, which can be internal or external, is coupled to the system bus 208 via a serial port interface.

In a networked environment, program modules depicted relative to the computation resource 202, or portions thereof, can be stored in remote memory apparatus. It will be appreciated that the network connections shown are exemplary, and other means of establishing a communications link between various computer systems and elements can be used.

A user of a computer can operate in a networked environment using logical connections to one or more remote computers, such as a remote computer 260, which can be a personal computer, a server, a router, a network PC, a peer device or other common network node, a laptop computer, notebook computer, palm top computer, network computer, smart phone, tablet, or other mobile device, or any processor-controlled device capable of performing the steps, methods, and functions described herein. Typically, a remote computer 260 includes many or all of the elements described above relative to the computer 200 of FIG. 2.

Embodiments described herein can be implemented on an Amazon g2.2xlarge GPU machine, an Amazon c4.8xlarge, or a multi-core CPU machine. The computer system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the invention since the invention is not limited to any particular computer architecture or network.

The computation resource 202 typically includes at least some form of computer-readable media. Computer-readable media can be any available media that can be accessed by the computation resource 202. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 202.

Communication media typically embodies computer-readable instructions, data structures, program modules. By way of example, and not limitation, communication media include wired media, such as wired network or direct-wired connections, and wireless media, such as acoustic, RF, infrared and other wireless media. The scope of the term computer-readable media includes combinations of any of the above.

More specifically, in the computer-readable program implementation, the programs can be structured in an object-orientation using an object-oriented language such as Java, Smalltalk or C++, an interpreted language such as Python, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 200 in FIG. 2, or on at least as many computers as there are components.

In an embodiment, the Generator software program embodiments on the source system are stored with other Application Programs 232 in non-volatile read/write memory 216 of a computation resource 202 of the Source System and includes instructions that, when executed by the one or more processing units 204, cause the computation resource 202 of the source system to generate one or more Synthetic Records, store the one or more Synthetic Records in data files with other program data 236 in non-volatile read/write memory 216 of the Source System, and transmit the one or more Synthetic Records via a LAN, WAN, or other connection to the target system.

The Generator software program instructions also include instructions that, when executed by the one or more processing units 204, cause the computation resource 202 of Source System to modify or update parameter values (for example, neural network parameter values) stored in System Memory 206 and/or non-volatile read/write memory 216 of the computation resource 202 of the source system, to generate and store, in data files with other program data 236 in non-volatile read/write memory 216 of the source system, one or more new batches of synthetic records for input to the Discriminator or Generator and Discriminator software programs on the target system, and to generate and store a final set of synthetic records in data files with other program data 236 in non-volatile read/write memory 216 of the source system. The methods described in FIGS. 5-7, and the other methods and processes described herein, can be implemented in computer code that stored in computer readable memory and executed by the computation resources of the source system and target system.

In an embodiment, the Generator and Discriminator software programs are stored with other Application Programs in non-volatile read/write memory of a computation resource of the remote computing device 260 hosting the target system and includes instructions that, when executed by the one or more processing units of remote computing device 260, cause the computation resource of the target system hosted on remote computing device 260 to perform the functions described herein and receive one or more synthetic records from the Generator on the source system, store the one or more Synthetic Records 108 in data files with other program data in non-volatile read/write memory of the computation resource of the target system hosted on remote computing device 260, perform the discrimination functions described herein, generate a gradient associated with the synthetic records as described herein, and transmit the gradient associated with the synthetic records via a LAN, WAN, or other connection to the Generator software program on the source system.

The terms and descriptions used herein are set forth by way of illustration only and are not meant as limitations. Those skilled in the art will recognize that many variations are possible with the spirit and scope of the invention, including as defined in the claim and their equivalents. The described embodiments illustrate the scope of the claim but do not restrict the scope of the claims.

What is claimed is:

1. A computer-implemented method of protecting confidentiality when generating synthetic training records for machine learning from sensitive data records, comprising:

establishing a data connection between two separate computer systems: a source computer system and a target computer system, wherein the source computer system comprises source media and generator software instructions that when executed cause the source computer system to perform the functions of a generator component of a first generative adversarial network;

wherein the target computer system comprises:

target media comprising a plurality of sensitive data records, wherein sensitive data records comprise private or confidential data, and discriminator software instructions that when executed cause the target computer system to perform the functions of a discriminator component of the first generative adversarial network and to generate parameter data, wherein the generator and discriminator functions of the generative adversarial network are distributed between the source computer system and the target computer system;

generating one or more synthetic training records using a computational process that does not reveal contents of the sensitive data records; and storing the one or more synthetic training records on the source media.

2. The computer-implemented method of protecting confidentiality when generating synthetic training records for machine learning from sensitive data records of claim 1, wherein the sensitive data records comprise medical data.

3. The computer-implemented method of protecting confidentiality when generating synthetic training records for machine learning from sensitive data records of claim 1, wherein the sensitive data records comprise medical data relating to opioid use.

4. The computer-implemented method of protecting confidentiality when generating synthetic training records for machine learning from sensitive data records of claim 1, further comprising:

transmitting a discriminator model and initial parameter values to the target computer system;

receiving updated parameter data from the target computer system;

generating one or more synthetic training records using the generator component and the updated parameter data.

5. The computer-implemented method of protecting confidentiality when generating synthetic training records for machine learning from sensitive data records of claim 1, further comprising:

transmitting a generator and discriminator model and initial parameter values to the target computer system;

receiving final parameter values from the target computer system;

generating one or more final synthetic records using the generator component and the final parameter values.

6. The computer-implemented method of protecting confidentiality when generating synthetic training records for machine learning from sensitive data records of claim 1, further comprising iteratively repeating the following steps until a termination point is reached:

generating, by the generator component, one or more synthetic training records;

transmitting via the data connection the one or more synthetic training records to the target computer system;

receiving from the target computer system via the data connection updated parameter data generated by the discriminator component from the one or more synthetic training records; and storing the updated parameter data in the source media.

7. The computer-implemented method of protecting confidentiality when generating synthetic training records for machine learning from sensitive data records of claim 1, wherein the generator component comprises a neural network and the generator parameter values comprise neural network parameter values.

8. The computer-implemented method of protecting confidentiality when generating synthetic training records for machine learning from sensitive data records of claim 1, wherein:

the first generative adversarial network is computer-implemented;

the source computer system comprises one or more processors, the source media is operationally coupled to the one or more processors, and the source media comprises computer usable non-transitory storage media; and the target computer system comprises one or more processors, the target media is operationally coupled to the one or more processors, and the target media comprises computer usable non-transitory storage media.

9. A computer system for protecting confidentiality when generating synthetic training records for machine learning from sensitive data records, comprising:

a target computer system, wherein the target computer system comprises:

one or more processors and target media operationally coupled to the one or more processors, a plurality of sensitive data records, wherein sensitive data records comprise private or confidential data, and discriminator software instructions that when executed cause the target computer system to perform the functions of a discriminator component of a first generative adversarial network and to generate parameter data, a separate source computer system connected via a data connection to the target computer system, comprising one or more processors and source media operationally coupled to the one or more processors, further comprising:

generator software instructions that when executed cause the source computer system to perform the functions of a generator component of the first generative adversarial network, and software instructions that when executed cause the source computer system to generate one or more synthetic training records using a computational process without knowledge of the contents of the sensitive data records and store the one or more synthetic training records on the source media, wherein the generator and discriminator functions of the generative adversarial network are distributed between the source computer system and the target computer system.

10. The computer system for protecting confidentiality when generating synthetic training records for machine learning from sensitive data records of claim 9, wherein the sensitive data records comprise medical data.

11. The computer system for protecting confidentiality when generating synthetic training records for machine learning from sensitive data records of claim 9, wherein the sensitive data records comprise medical data relating to opioid use.

12. The computer system for protecting confidentiality when generating synthetic training records for machine learning from sensitive data records of claim 9, wherein the source media and the target media each comprise computer-usable non-transitory storage media.

13. A computer-implemented method of training a computer-implemented machine learning model, said computer-implemented machine learning model being implemented on a computer system, said computer system comprising one or more processors and storage media operationally coupled to the one or more processors, said storage media comprising computer-usable non-transitory media, and the storage media comprising computer instructions which when executed by the one or more processors perform the functions of the machine learning model, comprising:

storing on the storage media one or more machine-learning training records comprising one or more synthetic training records created by the computer-implemented method of claim 1, from a plurality of sensitive data records, wherein sensitive data records comprise private or confidential data; and training the computer-implemented machine-learning model with the one or more machine-learning training records.

14. The computer-implemented method of training a computer-implemented machine learning model of claim 13, wherein the plurality of sensitive data records comprise medical data.

15. The computer-implemented method of training a computer-implemented machine learning model of claim 13, wherein the plurality of sensitive data records comprise medical data relating to opioid use.

16. The computer-implemented method of training a computer-implemented machine learning model of claim 13, wherein the machine-learning model is trained to predict opioid overdose.

\* \* \* \* \*